US006527280B2

(12) United States Patent
Frauhammer et al.

(10) Patent No.: US 6,527,280 B2
(45) Date of Patent: Mar. 4, 2003

(54) HAND HELD POWER TOOL

(75) Inventors: Karl Frauhammer, Leinfelden-Echterdingen (DE); Manfred Hellbach, Leinfelden-Echterdingen (DE); Gerhard Meixner, Filderstadt (DE); Heinz Schnerring, Dettenhausen (DE); Andreas Strasser, Rudersberg (DE)

(73) Assignee: Robert Bosch GmbH, Stuttgart (DE)

( * ) Notice: Subject to any disclaimer, the term of this patent is extended or adjusted under 35 U.S.C. 154(b) by 114 days.

(21) Appl. No.: 09/759,833

(22) Filed: Jan. 11, 2001

(65) Prior Publication Data

US 2001/0008186 A1 Jul. 19, 2001

(30) Foreign Application Priority Data

Jan. 14, 2000 (DE) ........................................ 100 01 193

(51) Int. Cl.$^{7}$ ................................................ B23B 5/22
(52) U.S. Cl. ........................................ 279/19.5; 279/75
(58) Field of Search .............................. 279/19.4, 19.5, 279/75, 904, 905, 140

(56) References Cited

U.S. PATENT DOCUMENTS

| | | | | | |
|---|---|---|---|---|---|
| 4,107,949 | A | * | 8/1978 | Wanner et al. | 279/75 |
| 4,491,444 | A | * | 1/1985 | Rumpp et al. | 279/75 |
| 4,655,464 | A | * | 4/1987 | Manschitz et al. | 279/140 |
| 5,076,371 | A | * | 12/1991 | Obermeier et al. | 279/75 |
| 5,211,693 | A | * | 5/1993 | Pacher | 279/904 |
| 5,603,516 | A | | 2/1997 | Neumaier | |
| 5,971,403 | A | * | 10/1999 | Yahagi et al. | 279/19.5 |
| 6,241,026 | B1 | * | 6/2001 | Wache et al. | 279/19.5 |

FOREIGN PATENT DOCUMENTS

| | | |
|---|---|---|
| DE | 42 05 840 A1 | 9/1993 |
| GB | 2 276 578 A | 10/1994 |
| GB | 2 276 579 A | 10/1994 |

* cited by examiner

*Primary Examiner*—Steven Wong
(74) *Attorney, Agent, or Firm*—Michael J. Striker

(57) ABSTRACT

A hand held power tool formed as a hammer drill has a strikingly drivable tool holder having a base body, at least one locking body with which the base body is form-lockingly connectable and through which the base body is fixable in a rotary direction in at least two positions, the locking body being formed as a ring-shaped component.

17 Claims, 3 Drawing Sheets

HAND HELD POWER TOOL

BACKGROUND OF THE INVENTION

The present invention relates generally to hand held power tools.

Hand held power tools are well known and widely utilized. In order to chisel with a tool, for example a flat chisel in different rotary positions. It is known to provide a hammer drill with a tool holder which can be adjusted in a rotary direction to different positions.

The tool holders as a rule have a base body which is fixed in an axial direction and in which a grooved shaft is displacable in an axial direction within a range which is limited by locking bodies. The base body is fixed in a rotary direction through individual locking balls which engage radially inwardly in grooves provided on the periphery of the base body and radially outwardly in recesses provided in an adjoining non-rotary component. In the locked condition, the locking balls are fixed radially outwardly by a locking sleeve which is guidable via an actuating sleeve to a position which radially releases the locking balls.

SUMMARY OF THE INVENTION

Accordingly, it is an object of present invention to provide a hand power tool which is a further improvement of the hand power tools of this type. More particularly, it is an object of present invention to provide a hand power tool, in particular a hammer drill with a tool holder which is strikingly drivable and has a base body, which is form-lockingly connectable at least with a locking body and is fixable through the base body in a rotary direction in at least two positions.

In keeping with these objects and with others which will become apparent hereinafter, it is proposed that the locking body is formed by a ring-shaped component. With a ring, which can be composed of a single part or many parts, it is possible in a structurally simple and cost-favorable manner to provide a large transmission surface, a small surface pressure, a small wear, and a high service life. Furthermore, a ring-shaped locking body can be mounted fast and simple and dismounted in the same way.

The locking bodies can be formed of one piece with another, preferably available component, for example in actuating sleeve, so that an additional component can be dispensed with.

In accordance with another embodiment of the present invention, it is proposed that the locking body is formed as a separate arresting ring. It can therefore provide a short structural length, and in particular with a separate arresting ring, a radial distance can be bridged, and a radially outer diameter over the periphery with an especially large transmission surface can be obtained.

The arresting ring preferably can have a set of teeth with a cross-section having at least partially trapeze-shaped recesses and/or trapeze-shaped teeth, for transmitting high torques.

The inventive solution can be used for different hand power tools with different tool holders. Due to the provision of a large transmission surface in a rotary direction, the inventive solution is suitable in particular for a tool holder with an axially displaceable base body for providing an idling or a drive connection, in which the transmission surface additionally is loaded by an axial movement and thereby with corresponding friction.

In order to guide the base body in its axial movement on a maximum possible diameter, over which a large transmission surface is obtained, the arresting ring can be mounted on the base body of the tool holder in an axial direction and guided in an axial direction in a set of teeth of a non rotatable component.

In accordance with another embodiment of the present invention, it is proposed that the base body of the tool holder is supported in the rotary direction over at least a set of teeth on an actuating sleeve, which preferably is also supported with at least one set of teeth in a housing part. Additional components, structural space, weight, mounting expenses and cost can be saved. Further, the set of teeth between the actuating sleeve and the housing part can provide an adjustment path which is independent from the axial position of an axially displaceable base body for locking and unlocking the base body in the rotary direction.

In order to provide simple turning of the actuating sleeve in the unlocked position of the base body, it is advantageous when the actuating sleeve is displaceable in an axial direction, and the connection between the first set of teeth of the actuating sleeve and the housing part is releasable by an axial actuating path before a connection between the second set of teeth of the actuating sleeve and the locking body. Furthermore, a short adjustment path for locking and unlocking can be obtained with a short set of teeth in the axial direction in the housing part.

The set of teeth in the housing part is arranged preferably radially inwardly and/or outwardly of a material ring. With the material ring a mechanical reinforcement of the set of teeth is provided. In particular, advantageously the region of the material ring in the case of the housing part formed as a gas part, can be used advantageously as a casting location during the manufacture.

The set of teeth in the housing part formed as a cast part has in its cross-section preferably at least partially round recesses and/or round teeth. They are advantageously molded and can be formed as highly loadable. Stress peaks can be avoided by great radii.

With the inventive solution a large transmission surface for the actuating sleeve is provided in a cost favorable manner, the actuating sleeve and/or the locking body can be advantageously formed as synthetic plastic parts and therefore produced in a specially cost favorable and simple manner.

For protecting the transmission surfaces from dust and dirt, and reducing or avoiding wear due to dirtying, it is proposed that a space which surrounds the locking body is structurally simply sealed outwardly by at least one sealing element. The sealing element in a structurally simple and cost favorable manner can be arranged between the actuating sleeve and an adjoining component.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
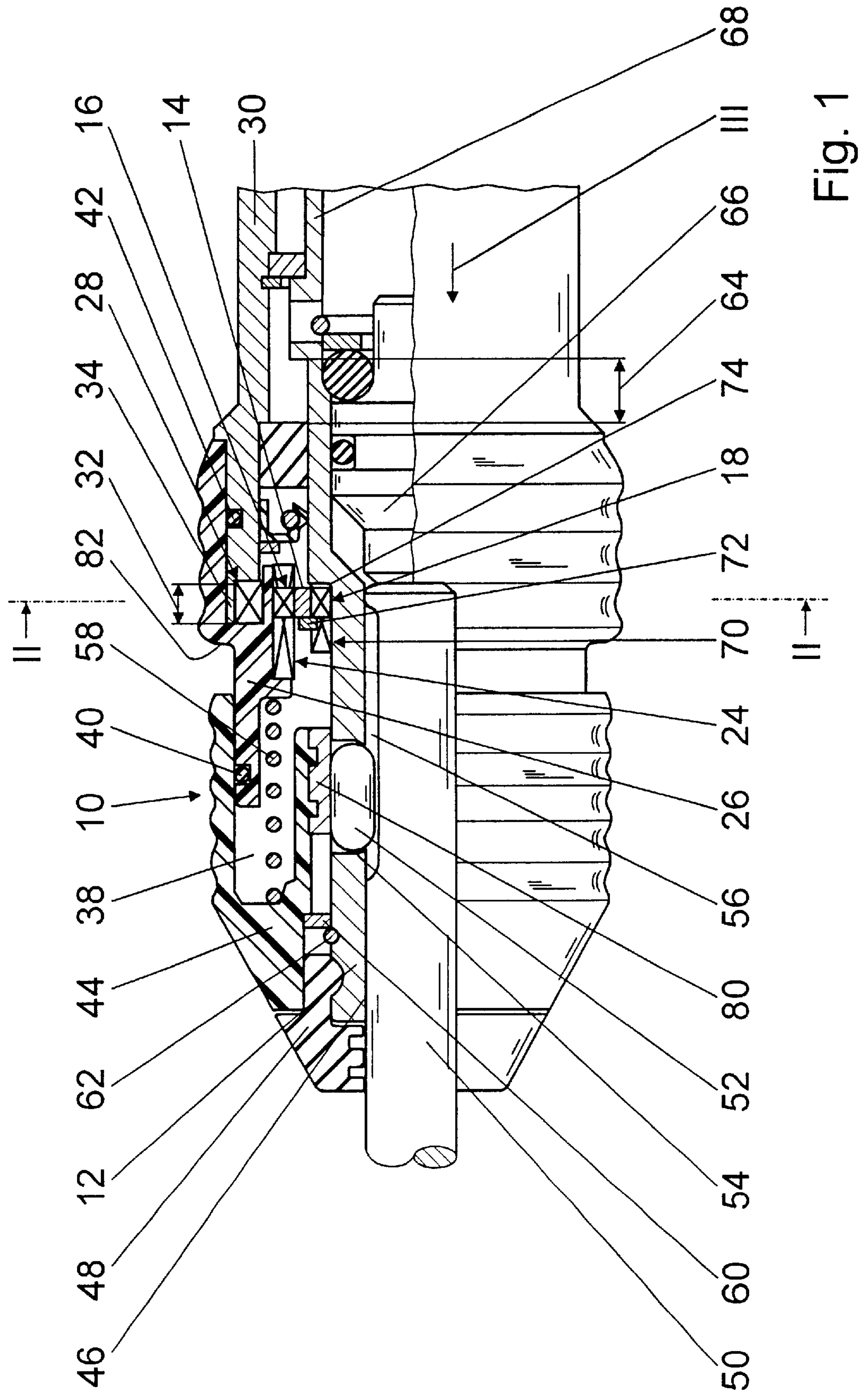
FIG. 1 is a view showing a front part of a hammer drill with a tool holder in accordance with the present invention.

FIG. 1 shows a front part of a hammer drill which is not shown in detail. It has a strikingly drivable tool holder 10 for receiving tools 50 with a grooved shaft.

A tool holder 10 has a base body 12 with a receiving opening 46. First and second radially displaceable locking rollers 52 are arranged in recessed 54 in the base body 12. They extend in receiving openings 46 and are guidable each in a corresponding groove 56 of the tool 50 which is closed at the end, For avoiding falling of the locking roller 52 without the tool 50 radially inwardly from the recessed 54, the recesses 54 narrow in a radially inner direction.

Locking rollers 52 are held in their locking position by a blocking sleeve 80 composed of metal. It secures the locking rollers 52 radially outwardly. The blocking sleeve 80 is connected in a form-locking manner in an axial direction with a synthetic plastic actuating sleeve 44. A protective cap 48 is mounted on a front end of the base body 12 of the tool holder 10. The actuating sleeve 44 is loaded in its direction by a pre-stressed helical pressure spring 58. The pressure spring is supported axially in a direction which faces away from the protective cap 48 against a tool housing 30 through a second synthetic plastic actuating sleeve 26. A tool housing 30 is formed as an aluminum pressure cast component. The actuating sleeve 44 is supported in an axial direction toward the protective cap 48 on a ring 60. The ring 60 is secured in an axial direction through a clamping ring 62 which is mounted in the base body 12. The helical pressure spring 58 holds the blocking sleeve 80 through the actuating sleeve 44 and thereby holds the locking rollers 52 in their locking positions.

The blocking sleeve 80 is displaceable by the actuating sleeve 44 to a position which radially releases the locking rollers 52. The actuating sleeve 44 is displaced against the helical pressure spring 58 axially in the directions which faces away from the protective cap 48.

The base body 12 is formed of one piece with tube 68. It is displaceably supported in an axial direction together with an anvil 66 arranged in the tube 68, for producing an idling or for producing a driving connection over a path 64. In the rotary direction, the base body 12 is form-lockingly connected with a locking body 14, through which it is fixable in a rotary direction in twelve positions.

Figure 2:
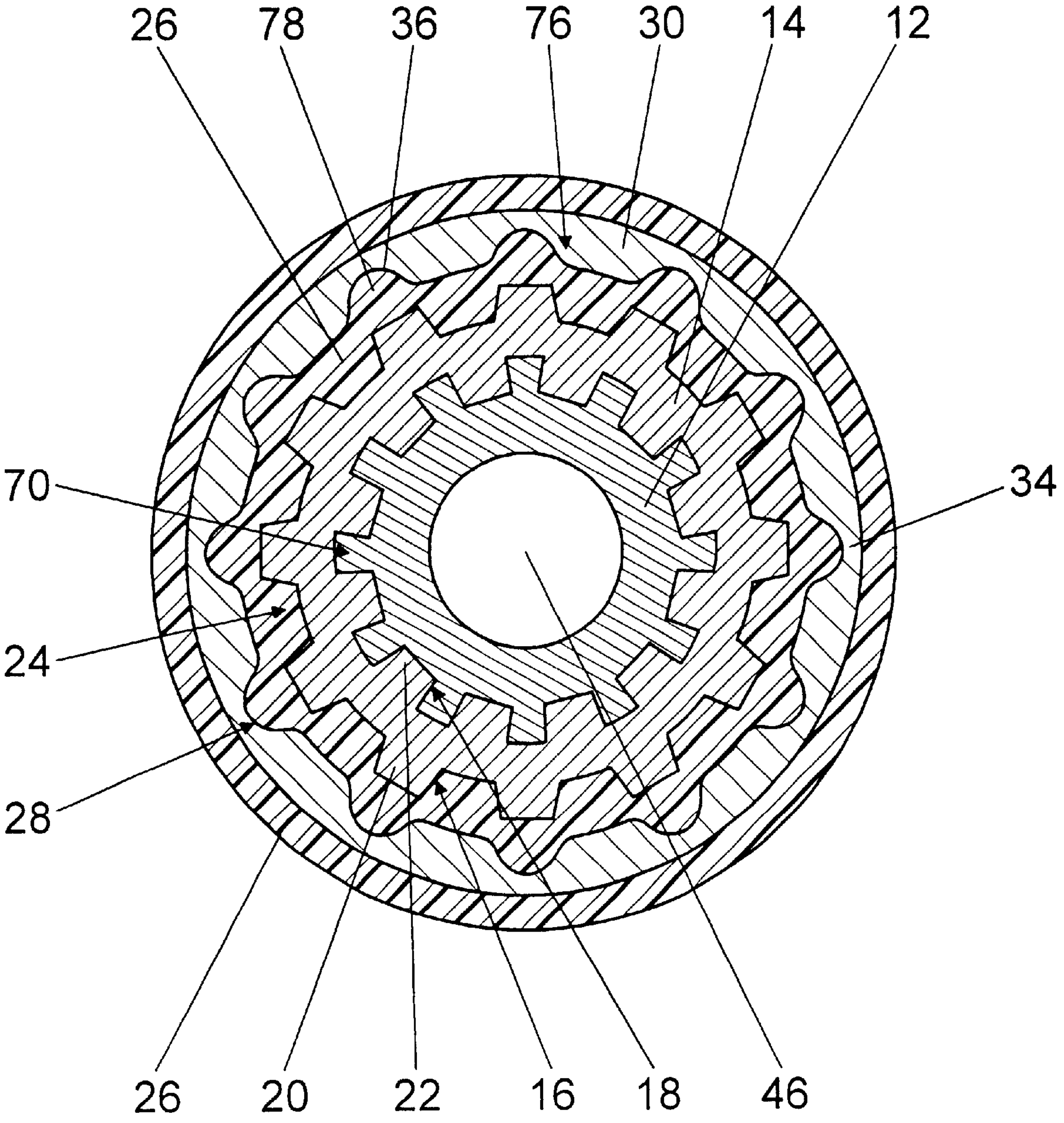
FIG. 2 is a view showing a section taken along the line II—II in FIG. 1.
Figure 3:
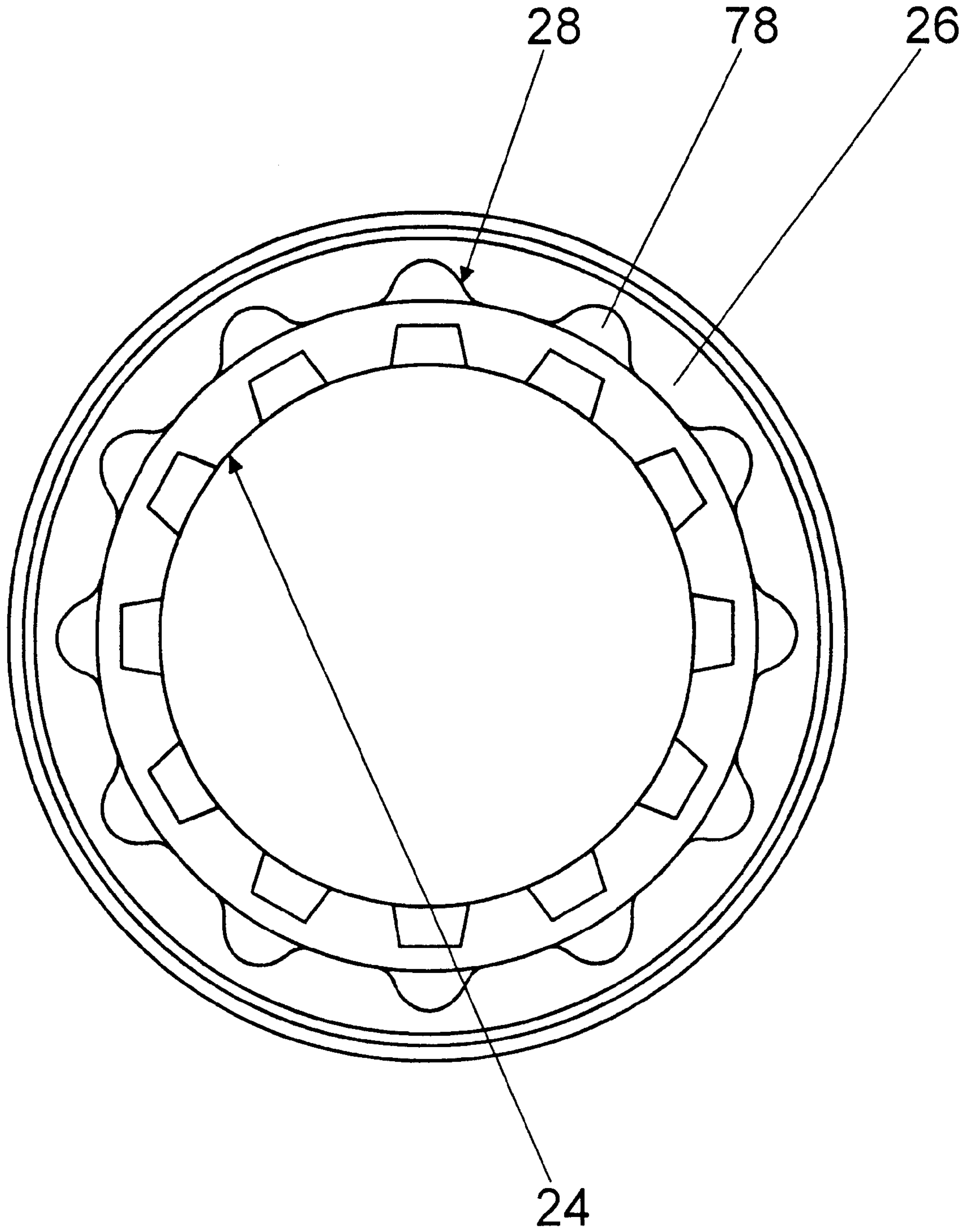
FIG. 3 is a view of an actuating sleeve in dismounted condition, as seen in direction III in FIG. 1.

In accordance with the present invention, the locking body 14 is formed by a separate arresting ring. The arresting ring has a first set of teeth 18 with trapezoidal teeth 22, which form-lockingly engage in a corresponding set of teeth 70 of the base body 12. It also has a second set of teeth 16 with trapezoidal teeth 20 which form-lockingly engage in a corresponding set of teeth 24 of the actuating sleeve 26, as shown in FIGS. 1, 2, 3.

The locking body 14 is fixed with a set of teeth 18 in the set of teeth 70 of the base body 12 in an axial direction between a clamping ring 72 and an abutment 74. It is displaceably guided in an axial direction with a set of teeth 16 in the set of teeth 24 of the actuating sleeve 26. The actuating sleeve 26 is supported in a rotary direction through a set of teeth 28 in a correspondingly shaped set of teeth 76 in the tool housing 30. The set of teeth 28 of the actuating sleeve 26 in a cross-section has rounded teeth 78 which engage in corresponding rounded recesses 36 of the set of teeth 76 of the tool housing 30. The set of teeth 76 of the tool housing 30 is arranged radially inwardly of a material ring 34, which serves as a reinforcement and whose region is used as a casting location during the manufacture of the tool housing 30.

In order to displace the tool holder 10, the actuating sleeve 26 is axially displaced in direction of the protective cap 48 against the helical screw spring 58. The connection between the set of teeth 28 of the actuating sleeve 26 and the tool housing 30 is releasable by an axial actuating path 32 before a connection between the set of teeth 24 of the actuating sleeve 26 and the locking body 14. Before the connection between the set of teeth 24 of the actuating sleeve 26 and the set of teeth 16 of the locking body 14 is released, the actuating sleeve 26 strikes axially to the shoulder 82 against the actuating sleeve 44. With the actuating sleeve 26, subsequently through the locking body 14, the base body 12 of the tool holder 10 can be turned with or without the tool 50 to a desired position. If the tool 50 is in the receiving opening 46, the rotary movement of the base body 12 is transmitted through the locking roller 52 to the tool 50. If the desired position is obtained, the helical pressure spring 58 displaces the actuating sleeve 26 to its initial position and locks the base body.

In accordance with the present invention, a space 38 which surrounds the locking body 14 is sealed by a first seal 40 and a second seal 42 from the outside. This protects the transmission surfaces between the sets of teeth 16, 18, 24, 28, 70, 76 from dust and dirt and reduces or eliminates wear resulting from dirtying. The first seal 40 is arranged radially between the actuating sleeve 26, 44 and the second seal 42 is arranged radially between the actuating sleeve 26 and the hammer housing 30.

It will be understood that each of the elements described above, or two or more together, may also find a useful application in other types of constructions differing from the types described above.

While the invention has been illustrated and described as embodied in hand held power tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A hand held power tool formed as a hammer drill comprising a strikingly drivable tool holder having a base body; at least one locking body with which said base body is directly and form-lockingly connectable and through which said base body is fixable in a rotary direction in at least two positions, said locking body being formed as a ring-shaped component.

2. A hand held power tool as defined in claim 1, wherein said locking body is formed by a separate arresting ring.

3. A hand held power tool as defined in claim 1, wherein said locking body has a set of teeth with a plurality of recesses which in a cross-section are at least partially trapezoidal shaped.

4. A hand held power tool as defined in claim 1, wherein said locking body has a set of teeth with a plurality of teeth which in a cross-section are at least partially trapezoidal shaped.

5. A hand held power tool as defined in claim 1, wherein said base body of said tool holder is axially displaceable for providing an idling or a driving connection.

6. A hand held power tool as defined in claim 1; and further comprising a non rotatable component having a set of teeth, said locking body being mounted on said base body of said tool holder and being guided in an axial direction in said set of teeth of said non rotatable component.

7. A hand held power tool as defined in claim 1; and further comprising an actuating sleeve, said base body of said tool holder being supported on said actuating sleeve in a rotary direction through at least one set of teeth.

8. A hand held power tool as defined in claim 7; and further comprising a housing part, said actuating sleeve being supported in a rotary direction in said housing part with at least one set of teeth.

9. A hand held power tool as defined in claim 8, wherein said actuating sleeve is displaceable in an axial direction, and a connection between said set of teeth and said actuating sleeve and said housing part is releasable by an axial actuating path before connection between said set of teeth and said actuating sleeve and said locking body.

10. A hand held power tool as defined in claim 8; and further comprising a material ring, said set of teeth in said housing part being arranged radially inwardly of said material ring.

11. A hand held power tool as defined in claim 8; and further comprising a material ring, said set of teeth in said housing part being arranged radially outwardly of said material ring.

12. A hand held power tool as defined in claim 8, wherein said set of teeth of said housing part formed as a cast part have a plurality of recesses which are at least partially round in a cross-section.

13. A hand held power tool as defined in claim 8, wherein said set of teeth of said housing part formed as a cast part have a plurality of teeth which are at least partially round in a cross-section.

14. A hand held power tool as defined in claim 7, wherein said actuating sleeve is composed of a synthetic plastic.

15. A hand held power tool as defined in claim 1, wherein said locking body is composed of a synthetic plastic.

16. A hand held power tool as defined in claim 7; and further comprising sealing means for sealing from outside a space which surrounds said locking body.

17. A hand held power tool as defined in claim 16, wherein said sealing means is arranged between an actuating sleeve and a component which adjoins said actuating sleeve.

* * * * *